United States Patent [19]

Soroi

[11] Patent Number: 4,656,145

[45] Date of Patent: Apr. 7, 1987

[54] ZIRCONIA TYPE BLACK DECORATIVE ARTICLE AND PROCESS FOR PRODUCTION THEREOF

[75] Inventor: Kazunori Soroi, Sendai, Japan

[73] Assignee: Kyocera Corporation, Kyoto, Japan

[21] Appl. No.: 564,694

[22] Filed: Dec. 23, 1983

[30] Foreign Application Priority Data

Dec. 25, 1982 [JP] Japan ................................ 57-231174
Oct. 25, 1983 [JP] Japan ................................ 58-200552

[51] Int. Cl.$^4$ ............................................. C04B 35/48
[52] U.S. Cl. ...................................... 501/86; 264/60; 264/65; 264/67; 501/103; 501/104
[58] Field of Search ..................... 501/86, 104, 103; 264/60, 65

[56] References Cited

U.S. PATENT DOCUMENTS 4,430,279  2/1984  Hagio et al. ................... 501/103

Primary Examiner—James Derrington
Attorney, Agent, or Firm—Spensley Horn Jubas & Lubitz

[57] ABSTRACT

Disclosed is a process for the production of a zirconia type black decorative article which comprises sintering an unsintered molded body comprising a matrix composed mainly of zirconia and at least one stabilizer contained in the matrix, said stabilizer being selected from $Y_2O_3$, MgO, $CeO_2$ and CaO, at a temperature of 1400° to 1600° C. in a non-oxidizing atmosphere so that the molded body becomes black, and subjecting the sintered body to the mirror polishing treatment. The decorative article prepared according to this process has a black and glossy mirror surface and also has high flexural strength and high toughness.

13 Claims, No Drawings

ZIRCONIA TYPE BLACK DECORATIVE ARTICLE AND PROCESS FOR PRODUCTION THEREOF

BACKGROUND OF THE INVENTION (1) Field of the Invention

The present invention relates to a black and glossy zirconia type decorative article and a process for the production thereof.

(2) Description of the Prior Art

A black decorative material formed by incorporating a pigment into an alumina ceramic material has been utilized, for example, as parts of a watch such as a watch case and a clockface. However, the alumina type decorative article is defective in that fine crystals are likely to fall down at the mirror polishing step conducted after the sintering step. Furthermore, since many voids are present in the crystals and the entire grain boundary, even if the mirror polishing is carried out, a mirror surface having a good smoothness and a deep gloss is not obtained. In this point, the alumina type decorative article is fatally defective.

Although this alumina type decorative article is excellent in the strength, when the decorative article is carelessly let to fall down and impinge against another article, the decorative article is readily cracked by a shock. In short, the alumina type decorative article is poor in the toughness.

SUMMARY OF THE INVENTION

It is therefore a primary object of the present invention to provide a zirconia type decorative article in which the above defects are eliminated.

Another object of the present invention is to provide a zirconia type black decorative article which has a black mirror surface having a good smoothness and a deep gloss and is excellent in the mechanical properties such as the flexural strength and toughness.

In accordance with one fundamental aspect of the present invention, there is provided a process for the production of a zirconia type black decorative article which comprises sintering an unsintered molded body comprising a matrix composed mainly of zirconia and at least one stabilizer contained in the matrix, said stabilizer being selected from $Y_2O_3$, MgO, $CeO_2$ and CaO, at a temperature of 1400° to 1600° C. in a non-oxidizing atmosphere so that the molded body becomes black, and subjecting the sintered body to the mirror polishing treatment.

In accordance with another aspect of the present invention, there is provided a zirconia type black decorative article, which comprises a sintered body of a molded body comprising a matrix composed mainly of zirconia and at least one stabilizer contained in the matrix, said stabilizer being selected from $Y_2O_3$, MgO, $CeO_2$ and CaO, wherein said sintered body has a black and glossy mirror surface formed by polishing.

DETAILED DESCRIPTION OF THE INVENTION

The present invention is characterized in that by sintering a molded body of a composition comprising a matrix composed mainly of zirconia and a stabilizer incorporated in the matrix in a non-oxidizing atmosphere described hereinafter and subjecting the sintered body to the mirror polishing treatment, a black mirror surface having a good smoothness and a deep gloss is produced and this sintered body is prominently excellent over a known pigment-colored sintered alumina body in the surface smoothness, gloss and toughness.

The sintered zirconia body has a lower void content than the sintered alumina body, and therefore, if a black decorative article is formed from the sintered zirconia body, it is possible to produce a mirror surface having a good smoothness and a deep gloss.

In zirconia, the monoclinic-tetragonal transition point resides at about 1000° C., and an abrupt volume change is caused at the time of the transition and the sintered body is broken. According to the present invention, by incorporating a known stabilizer such as $Y_2O_3$, MgO, $CeO_2$ or CaO into the matrix, a solid solution of the cubic system or tetragonal system is formed by sintering, whereby partially stabilized zirconia or stabilized zirconia is formed and the mechanical strength such as flexural strength and toughness are improved. Especially in case of partially stabilized zirconia, the toughness is highly improved by the martensite transformation and the flexural strength is prominently improved over that of alumina ceramics.

As means for coloring a sintered zirconia body into black, there is ordinarily considered a method comprising incorporating a black pigment formed of an oxide of Cr, Co, Mn or Ni in a matrix composed mainly of zirconia. This method, however, is defective in that the strength and toughness characteristics are degraded. In contrast, according to the present invention, by forming a black color component in the sintered body at the step of sintering a molded body of zirconia, formation of a black mirror surface becomes possible while preventing the degradation of the strength and toughness characteristics.

The stabilizer such as $Y_2O_3$, MgO, $CeO_2$ or CaO is ordinarily used in an amount of 3 to 55 mole % based on zirconia, which is sufficient to partially stabilize or stabilize zirconia. The specific amount used of the stabilizer differs according to the kind of the stabilizer, but ordinarily, the following can be mentioned.

If the amount of $Y_2O_3$ is 3 to 9 mole % based on zirconia, partially stabilized zirconia is formed, and if the amount of $Y_2O_3$ is 9 to 55 mole %, stabilized zirconia is formed. If the amount of CaO is 8 to 12 mole % based on zirconia, preferred partially stabilized zirconia is formed, and if the amount of CaO is 16 to 29 mole %, stabilized zirconia is formed. If the amount of MgO is 16 to 26 mole % based on zirconia, partially stabilized zirconia is formed.

The particle size of the zirconia powder or the stabilizer is not particularly critical, but the particle size is ordinarily smaller than 2.0 μm. and preferably smaller than 1.0 μm.

A sintering promotor such as silica, alumina or titania may be incorporated into the zirconia and stabilizer, so far as the attainment of the effects of the present invention is not inhibited.

According to the present invention, the above-mentioned powders are intimately blended, and the mixture is molded by known means. At the molding step, a binder such as a wax may be used. The molding pressure is adjusted so that the voids of the sintered molded body are as small as possible.

The molded body is sintered at a temperature of 1400° to 1600° C. in a non-oxidizing atmosphere so that the molded body becomes black. As the sintering atmosphere, there can be mentioned vacuum, an atmosphere of an inert gas such as nitrogen or argon, and most preferably, a carbon-containing atmosphere.

By this sintering treatment, at least one blackening component selected from a reduction product of zirconia, zirconium carbide and carbon is formed in the sintered molded body according to the sintering conditions, whereby a black mirror surface having a deep gloss can be formed. Ordinarily, in case of the sintering in vacuum or the inert gas atmosphere, the degree of blackening of the mirror surface is low, and in case of the sintering in the carbon-containing atmosphere, the degree of blackening is high. It is believed that in case of the sintering in the carbon-containing atmosphere, the amount formed of the reduction product of zirconia is increased, or by intrusion of carbon into the formed sintered body, the content of the blackening component such as zirconium carbide or carbon is increased. Incidentally, it must be noted that if the sintering is carried out in a hydrogen current, a black-colored sintered molded body can hardly be obtained.

The sintering is carried out at a sintering temperature of 1400° C. to 1600° C. If the sintering temperature is lower than 1400° C., the sintering is not caused, and if the sintering temperature is higher than 1600° C., even though blackening is advanced, the strength and toughness characteristics are degraded and no satisfactory decorative article can be obtained. It is preferred that the sintering temperature be in the range of from 1450° C. to 1550° C.

In accordance with a preferred embodiment of the present invention, carbon such as carbon black is charged into the non-oxidizing sintering atmosphere and carbon is intruded into the sintered body with sintering of the molded body of zirconia. If the carbon content in the sintered body is lower than 0.001% by weight, blackening is insufficient and no satisfactory decorative article can be obtained. If the carbon content exceeds 1% by weight, the flexural strength and toughness are degraded and the flexural strength is not higher than 50 kg/mm$^2$, and even if surface polishing is carried out, many voids are prominently caused to appear.

Accordingly, it is preferred that the carbon content in the sintered zirconia body be set at 0.001 to 1% by weight.

The sintering time is such that sintering of the molded zirconia body and blackening are sufficiently accomplished, and it is ordinarily preferred that the sintering time be 30 minutes to 5 hours.

Incidentally, it is preferred that after the sintering treatment, the sintered zirconia body be cooled at a temperature-lowering rate of 50° to 500° C./hr.

The obtained sintered zirconia body is subjected to mirror polishing to obtain a black decorative article such as watch case or clockface.

The present invention will now be described in detail with reference to the following examples directed to partially stabilized zirconia.

EXAMPLE 1

To 100 parts by weight of a zirconia powder having a high purity was added 5.7 parts by weight of Y$_2$O$_3$ as the stabilizer, and 100 parts by weight of water was further added and the mixture was pulverized for 3 days by a shaking mill and then dried. The pulverized mixture was passed through a 120-mesh sieve, a paraffin wax was then added and the mixture was passed through an 80-mesh sieve. The mixture was molded into an article having a size of 5 mm × 5 mm × 50 mm under a molding pressure of 1 ton/cm$^2$, and the binder was removed and the molded body was sintered at 1500° C. for 2 hours in vacuo. Then, the sintered body was cooled at a temperature-lowering rate of 200° C./hr.

The so-obtained sintered body was subjected to mirror polishing. Polishing was accomplished much more easily than in case of an alumina type black material. When the mirror surface was examined, it was seen that the mirror surface had a good smoothness and a deep gloss and the sintered body was very suitable as a decorative article.

The flexural strength and toughness of the sintered body were determined.

The flexural strength was measured according to the three-point bending test method of JIS R-1601. The critical stress enlargement coefficient when the sintered body was broken by the growth of micro-cracks was measured as the toughness of the sintered body according to the S.E.N.B. method (single edge notched beam method). It was found that the flexural strength was 100 kg/mm$^2$ and the toughness was 12MN/m$^{3/2}$, and it was confirmed that the sintered body had preferred characteristics for partially stabilized zirconia.

A zirconia type black decorative article formed by adding a black pigment together with a stabilizer to a zirconia powder and sintering the mixture will now be described by the following comparative example.

COMPARATIVE EXAMPLE

To 100 parts by weight of a zirconia powder having a high purity were added 5.3 parts by weight of Y$_2$O$_3$ as the stabilizer and 15 parts by weight of powders of oxides of Cr, Co, Mn and Ni as the known pigment, and the mixture was wet-pulverized and dried. The pulverized mixture was passed through a 120-mesh sieve and a paraffin wax was added, and the mixture was passed through an 80-mesh sieve. The mixture was molded into an article having a size of 5 mm × 5 mm × 50 mm under a molding pressure of 1 ton/cm$^2$, and the binder was removed and the mixture was sintered in a vacuum furnace maintained at 1450° C.

The obtained sintered body had a mirror surface having a good smoothness and a deep gloss as well as the sintered product obtained in Example 1, and furthermore, the degree of blackening was increased and the sintered body had a deep black luster. However, the flexural strength and toughness of the sintered body were 35 kg/mm$^2$ and 3MN/m$^{3/2}$, respectively, and the sintered body was much inferior in these characteristics to the sintered body obtained in Example 1.

EXAMPLE 2

To 100 parts by weight of a zirconia powder having a high purity was added 5.7 parts by weight of Y$_2$O$_3$ as the stabilizer, and 100 parts by weight of water was further added. The mixture was pulverized for 3 days by a shaking mill and then dried. The pulverized mixture was passed through a 120-mesh sieve, a paraffin wax was added thereto, and the mixture was passed through an 80-mesh sieve. The mixture was molded into an article having a size of 5 mm × 5 mm × 50 mm under a molding pressure of 1 ton/cm$^2$. The binder was removed, and the molded body was sintered in a reducing atmosphere containing 12 parts by weight of carbon at a sintering temperature of 1500° C. for 2 hours and was cooled at a temperature-lowering rate of 200° C./hr to obtain a sintered zirconia body having a carbon content of 0.004% by weight.

The so-obtained sintered body was subjected to mirror polishing. Polishing was accomplished much more easily than in case of an alumina type black material. When the mirror surface was examined, it was seen that the mirror surface had a good smoothness and a deep gloss was much blacker than the mirror surface obtained in Example 1 and the sintered body was very suitable as a decorative article.

The flexural strength and toughness of the sintered body were determined.

The flexural strength was measured according to the three-point bending test method of JIS R-1601. The critical stress enlargement coefficient when the sintered body was broken by the growth of micro-cracks was measured as the toughness of the sintered body according to the S.E.N.B. method (single edge notched beam method). It was found that the flexural strength was 100 kg/mm$^2$ and the toughness was 12MN/m$^{3/2}$, and it was confirmed that the sintered body had preferred characteristics for partially stabilized zirconia.

As is apparent from the results of the above-mentioned Examples and Comparative Example, excellent effects can be attained in the zirconia type black decorative article of the present invention. More specifically, by the mirror polishing treatment there can be obtained a mirror surface having a better smoothness and a deeper gloss than in case of an alumina type black article. Furthermore, since a pigment is not incorporated, the zirconia type black decorative article of the present invention has much higher flexural strength and toughness than a pigment-containing zirconia type black decorative article.

From the results of experiments made by us in connection with other stabilizers such as CaO and MgO, it was confirmed that the black mirror surface and the flexural strength and toughness were highly improved as in the foregoing Examples.

In order to obtain a stabilized zirconia type black article, the amount added of the stabilizer was greatly increased over the amount adopted in the foregoing Examples. Namely, $Y_2O_3$ was added in an amount of 9 to 55 mole % based on the zirconia powder or CaO was added in an amount of 16 to 29 mole % based on the zirconia powder. When an unsintered molded body of this composition was sintered in a carbon-containing reducing atmosphere and the sintered body was subjected to mirror polishing, a black mirror surface having a deep black gloss could be obtained.

As is apparent from the foregoing description, in the zirconia type black decorative article of the present invention, high strength and high toughness of partially stabilized zirconia are effectively utilized, and a decorative article having an improved strength and a high resistance to cracking by impingement against another article can be obtained. Namely, the decorative article of the present invention is excellent in the strength and toughness over the conventional zirconia type black decorative article and the reliability of the decorative article is highly improved.

Furthermore, since the zirconia type black decorative article of the present invention does not contain a pigment, the decorative article can be provided at a low cost and the present invention is advantageous from the economical viewpoint.

I claim:

1. A process for the production of a zirconia type black decorative article comprising:
    forming a molded body comprisng a matrix composed mainly of zirconia and at least one stabilizer selected from the group consisting of $Y_2O_3$, MgO, $CeO_2$ and CaO and further comprising a blackening component in an amount of from 0.001% to 1% by weight of said body selected from a group consisting of zirconium carbide, carbon or a reduction product of zirconia in an amount of 0.001% to 1% by weight;
    firing said molded body at a temperature of 1400° C. to 1600° C. in a non-oxidizing, atmosphere thereby forming a black sintered body; and
    polishing a surface of said sintered body to a mirror-like finish.

2. A process according to claim 1, wherein the unsintered molded body is sintered in a vacuum.

3. A process for the production of a zirconia type black decorative article comprising:
    forming a molded body comprising a matrix composed mainly of zirconia and at least one stabilizer selected from the group consisting of $Y_2O_3$, MgO, $CeO_2$ and CaO;
    firing said molded body at a temperature of 1400° C. to 1600° C. in a non-oxidizing, carbon-containing atmosphere, thereby forming a black sintered body, wherein said molded body is fired such that a blackening component is formed in an amount of from 0.001% to 1% by weight of said body, said blackening component being selected from the group consisting of carbon, zirconium carbide or a reduction product of zirconia; and
    polishing a surface of said sintered body to a mirror-like finish.

4. A process according to claim 3, wherein the carbon is carbon black.

5. A process according to claim 3, wherein yttria is incorporated in an amount of 3 to 55 mole % based on zirconia.

6. A process according to claim 3, wherein calcia is added in amount of 8 to 29 mole % based on zirconia.

7. A process according to claim 3, wherein magnesia is incorporated in an amount of 16 to 26 mole % based on zirconia.

8. A process according to claim 3, wherein the particle size of either zirconia or the stabilizer is smaller than about 2.0 μm.

9. A zirconia type decorative article having a black glossy mirror surface with a high degree of smoothness formed by polishing, said article comprising a sintered body formed from a matrix composed mainly of zirconia and at least one stablizer contained in said matrix, said stabilizer being selected from a group consisting of $Y_2O_3$, MgO, $CeO_2$ and CaO, and further wherein said sintered body contains at least one blackening component selected from a group consisting of zirconium carbide, carbon or a reduction product of zirconia in an amount of 0.001% to 1% by weight.

10. A decorative article as set forth in claim 9, wherein said sintered body has a flexural strength of at least 50 kg/mm$_2$.

11. A zirconia type decorative article having a black glossy mirror surface with a high degree of smoothness prepared by the process set forth in claim 1.

12. A zirconia type decorative article having a black glossy mirror surface with a high degree of smoothness prepared by the process set forth in claim 3.

13. A process according to claim 1 wherein said molded body is sintered in an inert gas atmosphere comprising nitrogen or argon.

* * * * *